United States Patent [19]

Kawano et al.

[11] Patent Number: 5,361,366
[45] Date of Patent: Nov. 1, 1994

[54] COMPUTER EQUIPPED WITH SERIAL BUS-CONNECTED PLURAL PROCESSOR UNITS PROVIDING INTERNAL COMMUNICATIONS

[75] Inventors: Katsumi Kawano, Kawasaki; Kinji Mori, Machida; Masayuki Orimo, Kawasaki; Hiroshi Fujise, Yokohama; Masuyuki Takeuchi, Fujisawa; Shoji Iwamoto; Hitoshi Suzuki, both of Owariasahi, all of Japan

[73] Assignee: Hitachi, Ltd., Tokyo, Japan

[21] Appl. No.: 628,578

[22] Filed: Dec. 17, 1990

[30] Foreign Application Priority Data

Dec. 26, 1989 [JP] Japan .................. 1-336965

[51] Int. Cl.⁵ .................. G06F 13/36; G06F 13/00
[52] U.S. Cl. .................. 395/800; 395/200; 395/325; 364/240; 364/244; 364/242.96; 364/DIG. 1
[58] Field of Search ........ 395/200, 425, 800, 200, 395/325

[56] References Cited

U.S. PATENT DOCUMENTS 4,430,699  2/1984  Segarra et al. ............ 395/200
5,047,925  9/1991  Kun et al. ............ 395/200

Primary Examiner—Thomas C. Lee
Assistant Examiner—Paul R. Lintz
Attorney, Agent, or Firm—Fay, Sharpe, Beall, Fagan, Minnich & McKee

[57] ABSTRACT

A loosely coupled multiprocessor computer includes an input/output control unit for fetching both a program and data derived from an external input device and also for outputting processed data to an external output device; storage for storing therein both the program and data inputted from said input/output control unit; process unit for sequentially executing a processing operation of the data based upon the program stored in the storage; and, a transmission medium for coupling the process unit, input/output control unit and storage with each other. In the loosely coupled multiprocessor computer, a serial transmission medium is employed as the transmission medium. A transmission control unit for performing both a conversion process between data to be transmitted, flowing through the serial transmission medium and the processed data, and also a transmission/reception process of the data to be transmitted via the serial transmission medium, is provided with the input/output control unit, storage and process unit. A unit process unit for controlling the input/output control unit, storage, and transmission control unit is provided with the input/output control unit and storage with the transmission control unit.

7 Claims, 17 Drawing Sheets

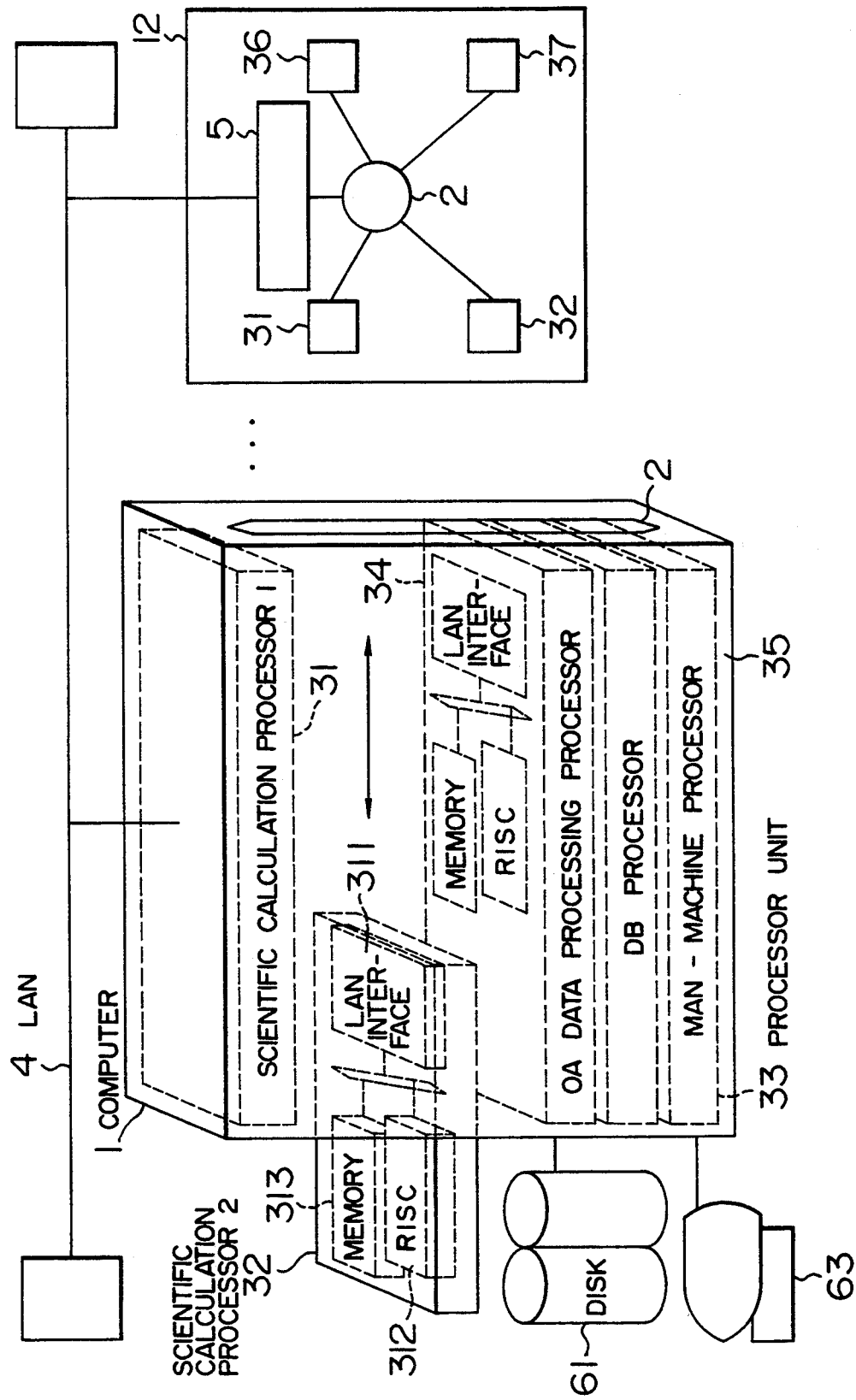

F I G. 12
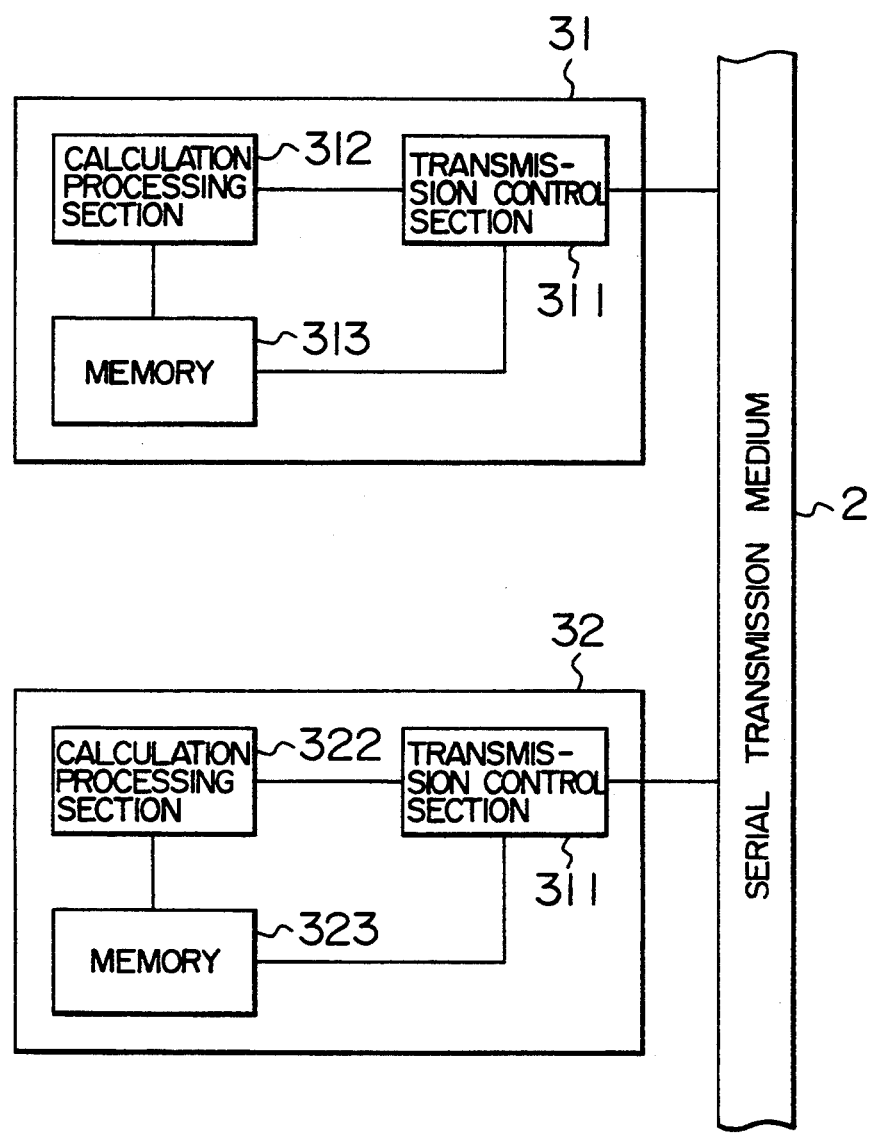

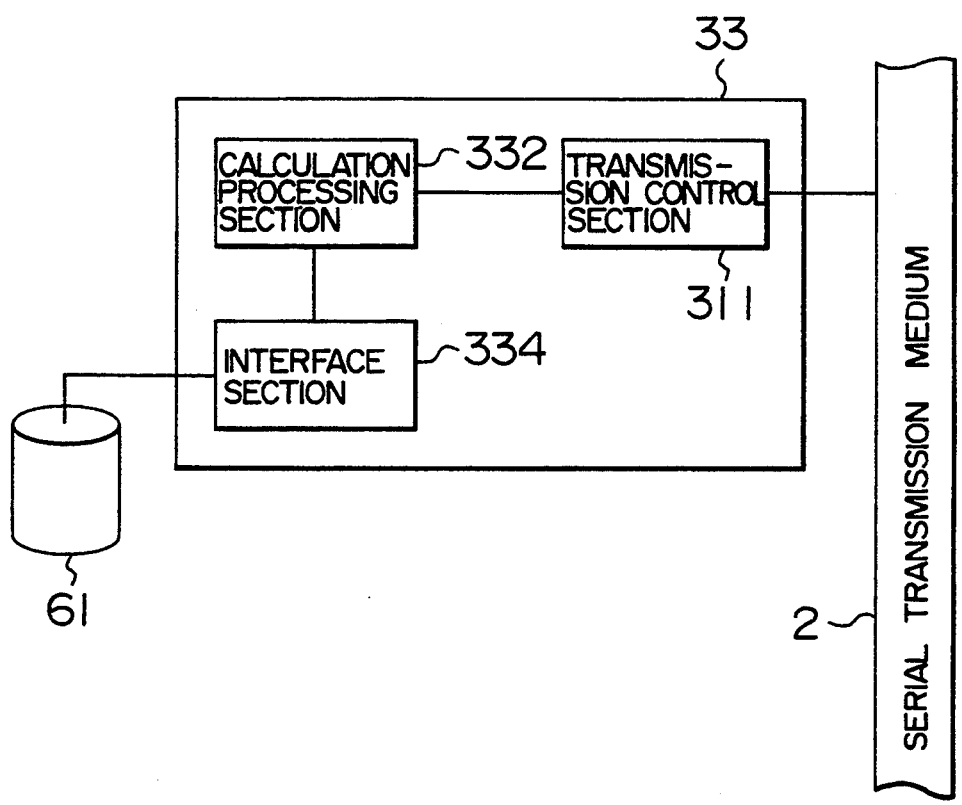
F I G. 13

COMPUTER EQUIPPED WITH SERIAL BUS-CONNECTED PLURAL PROCESSOR UNITS PROVIDING INTERNAL COMMUNICATIONS

BACKGROUND OF THE INVENTION

The present invention generally relates to an architecture for both a hardware and a software used within a computer, and more specifically, to a computer including a loosely coupled multiprocessor.

Conventional computers have been developed and have progressed in such a manner that elements are highly integrated and physical distances among the elements are reduced as much as possible in order to increase processing speeds of these computers.

In FIG. 8, there is shown a schematic block diagram of a basic construction of the conventional computer.

A computer 80 includes as five major devices, a calculation device 81, a control device 82, a storage device 83, an input device 84, and an output device 85. Further, both the calculation device 81 and the control device 82 are incorporated into a central processing unit (referred to as a "CPU").

The computer 80 with the above-described construction executes the following operations.

First, a program is read out from the input device 84, and then is stored into a program region within the storage device 83. The control device 82 sequentially reads out the programs stored within this storage device 83 one by one so as to be decoded, and thereafter sends various instructions to the input device 84, output device 85 and storage device 83 which are required to execute commands written in the programs.

When, for instance, the command of the program corresponds to a command (READ command and the like) for requesting a data input, the inputted data is stored into an input region within the storage device 83.

Also, when the decoded command corresponds to a calculation command, data to be calculated is sent to the calculation device 81 in which a predetermined calculation is carried out.

Furthermore, data to be outputted is stored into an output region of the storage device 83. In response to an output command (WRITE command), the data stored in this output region is outputted by utilizing the output device 85.

As previously described, the computer 80 fetches the commands stored in the storage device 83 one by one, and executes processing operations in accordance with the programmed sequence.

Various system arrangements have been proposed in order to increase reliability of the computer systems with employment of such computers.

Among these computer systems, there is a multiprocessor system. In accordance with the multiprocessor system, a plurality of processors (processing device including CPU as an element) constitute a system for commonly using a main storage device and a file. When malfunction happens to occur, if only failed devices, processors, or a troubled unit employed within the main storage device are isolated from the computer system, the computer system may continue the processing operations, although the processing capabilities of the data are lowered. As a consequence, such a multiprocessor computer system has better adaptability and therefore is suitable for constituting a large-scale on-line computer system.

This multiprocessor system may be further understood as one of parallel-processing computer systems.

"Parallel processing" operations imply that processing operations which have been performed by a single processor employed within the conventional computer, are performed in a parallel form by parallel-operating plural processors. As a result, highspeed processing operations may be realized.

As to the parallel processing operation, it may be subdivided into SIMD (Single Instruction Multiple Datastream; a single instruction and plural data method), and MIMD (Multiple Instruction Multiple Datastream; a plural-instruction and plural data method), depending upon arrangements of processors and processing methods.

The "SIMD" method is such a method wherein a plurality of processors execute plural data in synchronization with each other in response to the same instruction supplied from a central control device. Since each of the processors can parallel-execute the same instruction in this SIMD method, this method is suitable for such a case that similar types of calculations are performed for a large quantity of data.

In accordance with the MIMD method, on the other hand, each of the processors is independently operable, and a plurality of data processing operations are executed in an asynchronization mode in response to a plurality of different instructions. Since the respective processors are separately operated, control functions are provided within these processors. Also, communication networks to perform information exchanges among the respective processors are provided, which is similar to that of the SIMD method.

FIG. 9 is a schematic block diagram for representing a system arrangement of the MIMD method.

A processor (1) 911, a processor (2) 912, and a processor (n) 913 include an ALU (arithmetic logic unit) 914, a storage unit 915, a control unit (1) 914, a control unit (2) 917, and further a control unit (n) 918, respectively, and are connected to either a coupling network, or a shared memory 919.

A multiprocessor system which corresponds to an MIMD method, is constructed so that a large number of processors closely communicate with each other with employment of a highspeed coupling network and are operable in a parallel mode with better cooperation.

Then, the multiprocessor system is roughly categorized into two communication methods effected among the processors.

(a) Multiprocessor Sharing Memory

Each of the processors is operable by sharing a main storage device. The main storage device may be directly accessed by an instruction of the respective processors. If all of storage domains are completely shared, the access traffic to the main storage device becomes large, whereas when the number of the processors is increased, a bottleneck occurs and thus performance of the multiprocessor is degraded.

As a consequence, there are many possibilities to employ the following methods.

(i) Each of processors is equipped with own local memory, the access of which does not compete with the accesses of other processors, and a shared region is limited to a portion.

(ii) Each of processors is equipped with a cache memory.

(iii) A shared memory domain is subdivided into a plurality of partial domains, which will be allocated to each processor.

A memory shared type multiprocessor corresponds to a tightly coupled multiprocessor, and the total number of processors is suppressed due to the accessing contention to the shared memory, and therefore becomes small normally.

(b) A Message Exchange Type Multiprocessor

Communications among processors are performed via I/O ports in a message communication mode. A packet communication method and the like are employed. The message exchange type multiprocessor corresponds to a loosely coupled multiprocessor. The total number of the processors may be selected to be greater than that of the above-described memory shared type multiprocessor, depending upon the communication network condition and applications.

In general, conventional computers have been improved by improving the processing capabilities including the respective reliabilities. The processing speeds of the elements employed in the conventional computers are increased, and on the other hand, the processing capabilities are improved by computer system arrangements. Among these improvements, there is one particular improving method, i.e., a parallel processing operation by multiprocessor systems.

In the processors employed in the conventional processor system, the data and control signal communications are performed via the parallel bus within the processors.

That is to say, each of units is connected via an internal bus to each other, which is similar to the normal computer.

In FIG. 9, for instance, various signals are mutually transmitted/received via the internal bus among the ALU 914, storage unit 915 and control unit (1) 915 employed within the processor (1).

As previously described, since the respective processors employed in the multiprocessor system are operable similar to those of the normal computer, when, for instance, the storage unit 915 in the processor (1) 911 is brought into malfunction, the power source of the processor (1) 911 is turned off, whereby the failed storage unit 915 is repaired.

Also, even when the function of the processor (1) 911 is expanded, the power source of this processor (1) 911 is once turned off and thereafter must be isolated from the multiprocessor system.

As previously explained, no specific care has been taken into such expansion and maintenance of the processor per se in the conventional computer system. Therefore, the processing operation required for each of the processors must always be carried out, taking into account the functions and processing operations of other processors. To mutually operate these processors, complex and large-scale management software is necessarily required, which may result in lowering the performance of the computer system.

In addition, when malfunction of processors happens to occur, the malfunctioning processors must be isolated from the entire system and therefore the processing capabilities of the computer system are deteriorated.

SUMMARY OF THE INVENTION

An object of the present invention is to solve these problems of the conventional computer systems, and to provide a computer capable of loosely-coupling a CPU and various devices such as storage devices employed in a computer so as to establish a loosely coupled hardware architecture, whereby the respective devices are mutually operable on the loosely coupled hardware architecture in order to perform a parallel processing operation at a higher speed; and also capable of performing maintenance as well as expansion processing operations of the computer, while continuing the computer processing operations.

To achieve such an object, a computer, according to the present invention, constructed of a plurality of processors, these processors being stored within a single housing, has a serial transmission medium employed as a common transmission medium for coupling the processors.

Furthermore, a computer system, according to the present invention, where a plurality of computer units are connected with each other via a transmission medium, is featured in that at least one of these computer units is arranged by a plurality of processors, and also these processors are mutually connected via a serial transmission medium.

BRIEF DESCRIPTION OF THE DRAWINGS

FIG. 1b schematically illustrates an example of a computer mounting construction according to the present invention;

FIG. 12 is a schematic block diagram for representing an internal arrangement of the computer shown in FIG. 10;

FIGS. 13 and 14 are schematic block diagrams for representing an internal arrangement of a computer according to a further preferred embodiment of the present invention;

DESCRIPTION OF THE PREFERRED EMBODIMENT

Various preferred embodiments according to the present invention will now be described with reference to drawings more in detail.

Figure 1A:
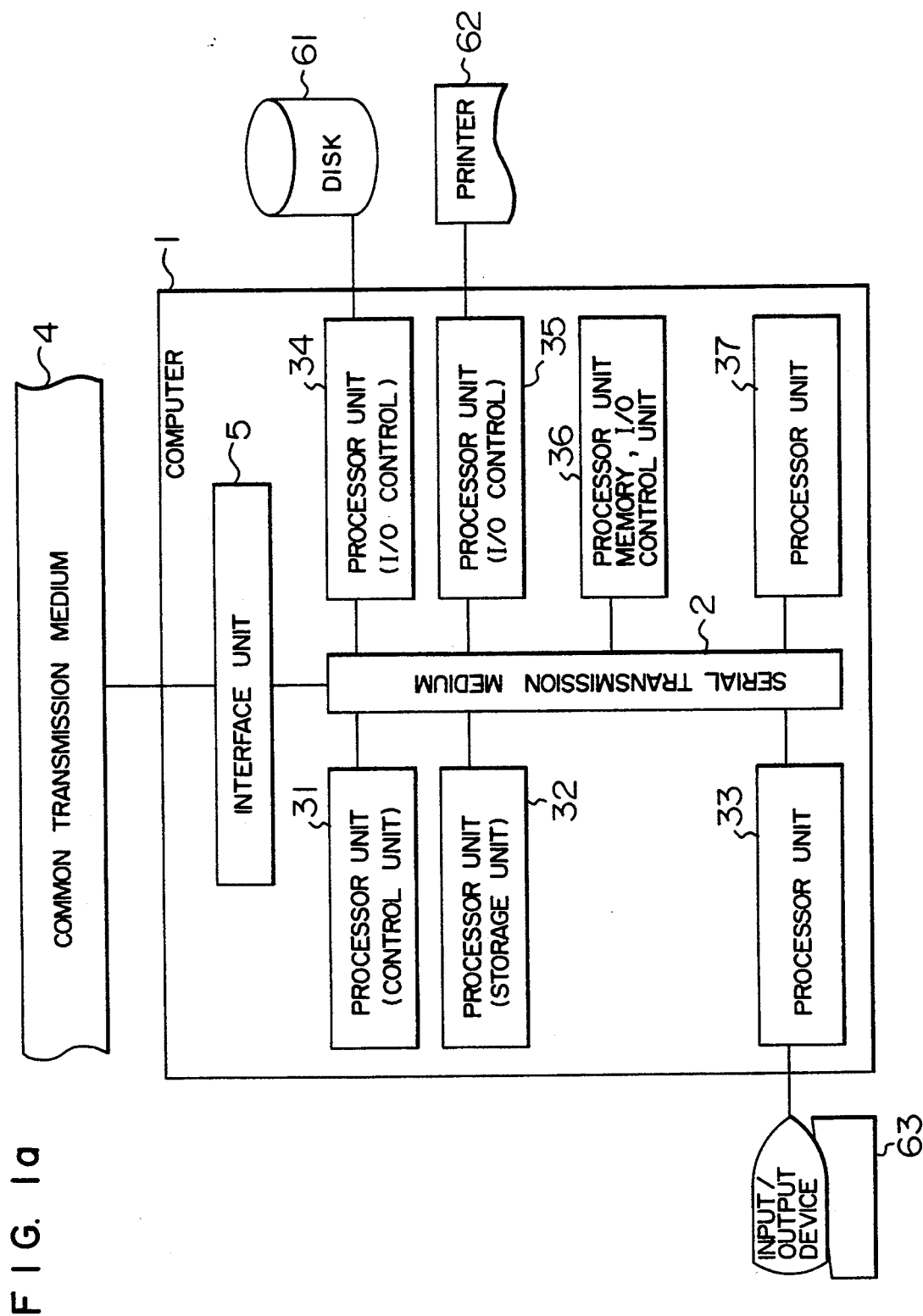
FIG. 1a is a schematic block diagram for representing a preferred embodiment of a computer according to the present invention.

FIG. 1a is a schematic block diagram of circuit arrangement of a computer according to a preferred embodiment of the present invention.

A computer 1 is so arranged by a plurality of processor units 31 to 36; a serial transmission medium 2 for connecting these processor units with each other; and an interface unit 5 for interfacing the serial transmission medium 2 and a common transmission medium 4 used to connect other computers therewith. Then, the computer 1 is connected via the common transmission medium 4 to other computers (not shown).

In general, this serial transmission medium 2 corresponds to a transmission medium employed in a network, is made of an optical fiber, a coaxial cable, a twisted pair line.

The processor units 31 to 36 are constructed as a storage unit, a control unit and the like, respectively and have such a basic arrangement of an interface unit with the serial transmission medium 2 and a control function as the processor unit.

The processor unit 31 corresponds to the control unit having a function as a control section in the computer 1, whereas the processor unit 32 corresponds to the storage unit having a memory.

The processor unit 33 has a function for interfacing an input/output device therewith, and is connected to an external input/output device 63. Similarly, the processor unit 34 is connected to an external disk 61, and the processor unit 35 is connected to a printer 62.

Then, the processors 36 and 37 are equipped with a memory and an I/O control section, and have functions as a single independent computer.

It should be noted that this arrangement shown in FIG. 1 is merely one example, and therefore the present invention is not limited to this arrangement. That is to say, the combinations between the processor units and internal arrangements of the processor units, and also quantities thereof may be freely changed in accordance with purposes. Similarly, it should be understood that the below-mentioned processing operations are merely an example, and when the internal arrangements of the processor units, combinations between the processor units and also quantities thereof are changed so as to newly perform another processing operation, a computer constructed of these processor units may execute a desirable processing operation.

FIG. 1b is an illustration for showing one example of a mounting structure for the computer shown in FIG. 1a according to the present invention.

In this figure, the computer 1 is constructed of the processor units 31 to 35 installed within a single housing, and also the serial transmission path 2 installed within this housing. In FIG. 1b, there is shown a LAN (Local Area Network) employing an optical fiber as the serial transmission path 2. Each of these processor units is so constructed that, as shown in the processor unit 32, these processor units may be detachably connected to this LAN 2 and housing. Connectors (not shown) employed at a LAN interface unit for the processor unit and also at the LAN 2 are employed to connect/disconnect the respective processor units. An internal arrangement of the respective processor unit is constructed of a calculation processing section (RISC) 312 and a memory 313 other than a LAN interface section 311, as will be discussed later.

In the example of FIG. 1b, the computer 1 stored in this single housing is further connected via the common transmission medium 4 externally provided to another computer 12. Alternatively, the computer 1 may be solely employed. It should be noted that although not shown in FIG. 1b, the LAN 2 is connected via the interface unit to the computer.

The computer 1 with the arrangement shown in FIG. 1a will perform the following operations.

A command inputted from the input/output device 63 is processed in the processor unit 33. In the case when this command processed in the processor unit 33 is to instruct execution of a certain program, data for instructing the execution of this program is transferred to the serial transmission medium 2. When this program has been stored in, for instance, the disk 61, the processor unit 34 fetches the above-described data from the serial transmission medium 2, and transfers this program to the serial transmission medium 2. The processor unit 31 for executing a control of a program receives the program as data from the serial transmission medium 2, and performs the processing operation thereon. As a result of this processing operation, when, for example, an output to the input/output device 63 is required, this processed result is sent as the data to the serial transmission medium 2. This data is fetched by, for instance, either the processor unit 33 or 35, and then outputted to either the input/output device 63 or printer 62.

It should be noted that a transmission procedure or sequence for transmitting/receiving data via the serial transmission medium 2, which has been produced by the above-described series of data processing operation, is performed in accordance with a proper transmission procedure (will be described later).

Data transmission/reception among the units is performed via the serial transmission medium 2 with each other.

It should also be noted that a series of data processing operations may be executed by employing the processor units 36 and 37.

Then, the computer 1 is connected via the interface unit 5 to the common transmission medium 4, and performs a data processing operation in parallel with a similar computer (not shown) connected to this common transmission medium 4.

As described above, each of the function processor units employed within the computer 1 shown in FIG. 1 is connected via the serial transmission medium 2 to each other and the data transmission/reception among the processor units are performed via this serial transmission medium 2. As a consequence, neither shared memory, nor system bus is present in the computer, which is similar to the conventional multiprocessor, so that these processors are loosely coupled with each other in view of hardware and software.

Since the respective processor units are loosely coupled with each other, the computer 1 may be constructed by freely combining a plurality of processors having various functions, and therefore may be realized as a loosely coupled multiprocessor computer.

Even when, for instance, another processor unit is additionally employed so as to expand a function, and maintenance of a single processor is carried out, expansion and maintenance processing operations may be executed without interrupting a power supply of the computer 1, while performing the processing operations.

In other words, the processor units may be connected/disconnected within the computer in a unit of a single processor unit without interrupting the operations of the computer.

It should be noted that the transfer control for transmitting/receiving data via the serial transmission medium 2 may by performed based upon a previously determined transfer protocol.

Also, this transfer control method may be realized by utilizing the protocol of the conventional LAN (Local Area Network) and conventional apparatuses. In this case, this transfer control function is realized by an interface section with the serial transmission medium 2. Generally speaking, this interface section corresponds to a LAN adapter.

Otherwise, an optical fiber may be employed as the serial transmission medium 2, as will be discussed later.

Since the same operating systems (i.e., software management program) operable on the respective processor units in the computer 1 are employed, compatibility or interchangeability among these processor units may be established and the interchanging operation as well as the processing operation for the expansion may be easily performed.

FIG. 2 is a schematic block diagram for showing an example of an internal arrangement of a processor unit for the computer shown in FIG. 1.

Figure 2A:
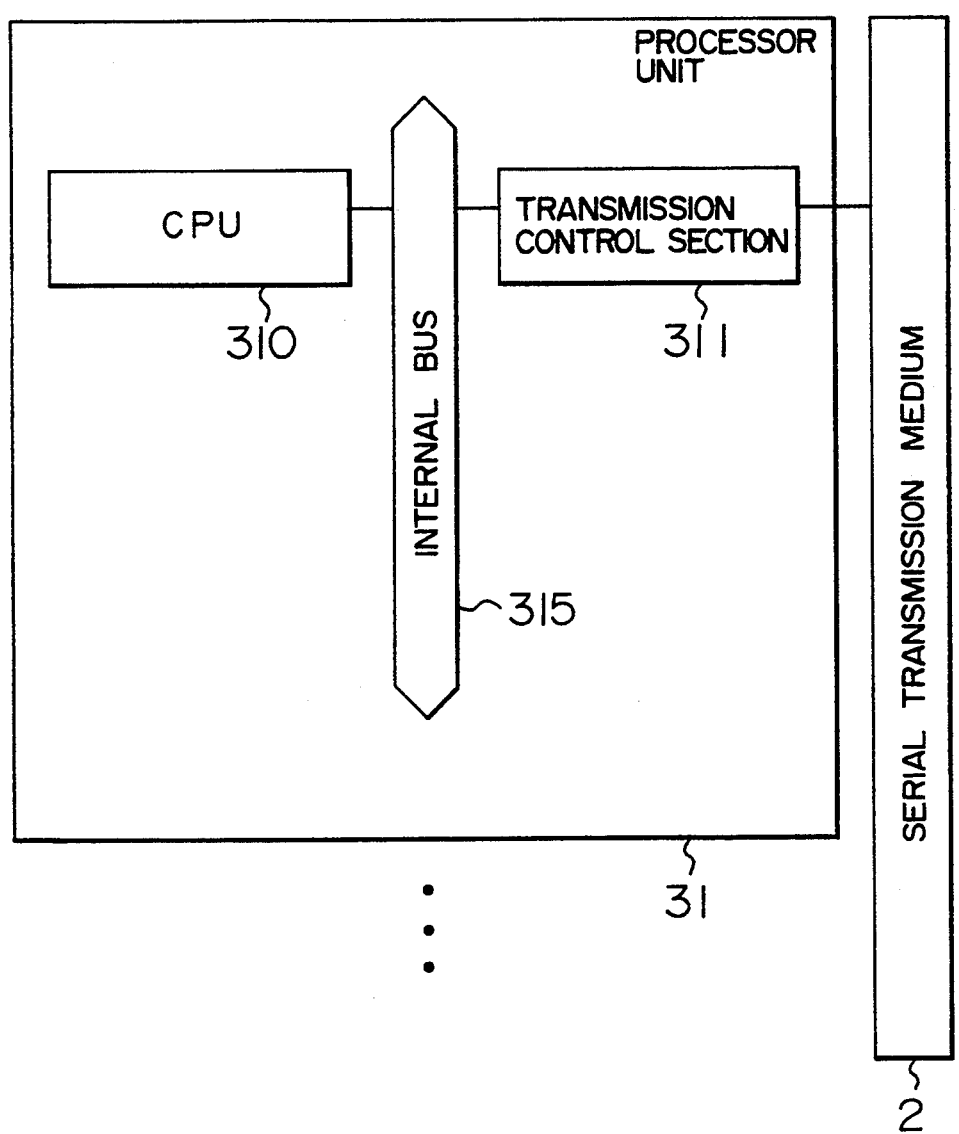
FIGS. 2a to 2d are schematic block diagrams for showing internal arrangements of the computer shown in FIG. 1.

FIG. 2a represents an internal arrangement of the processor unit 31, in which a transmission control section 311 functioning as an interface with the serial transmission medium 2 and the processor unit 31 is connected to a CPU (central processing unit) 310 via an internal bus 315.

The CPU 310 controls an overall operation of the computer 1 shown in FIG. 1. The transmission control section 311 performs the data transmission/reception between the processor 310 and processors employed within other processor units through the serial transmission medium 2.

The processor unit 31 has such a function as the central processing unit (CPU) in the conventional computer.

Figure 2B:
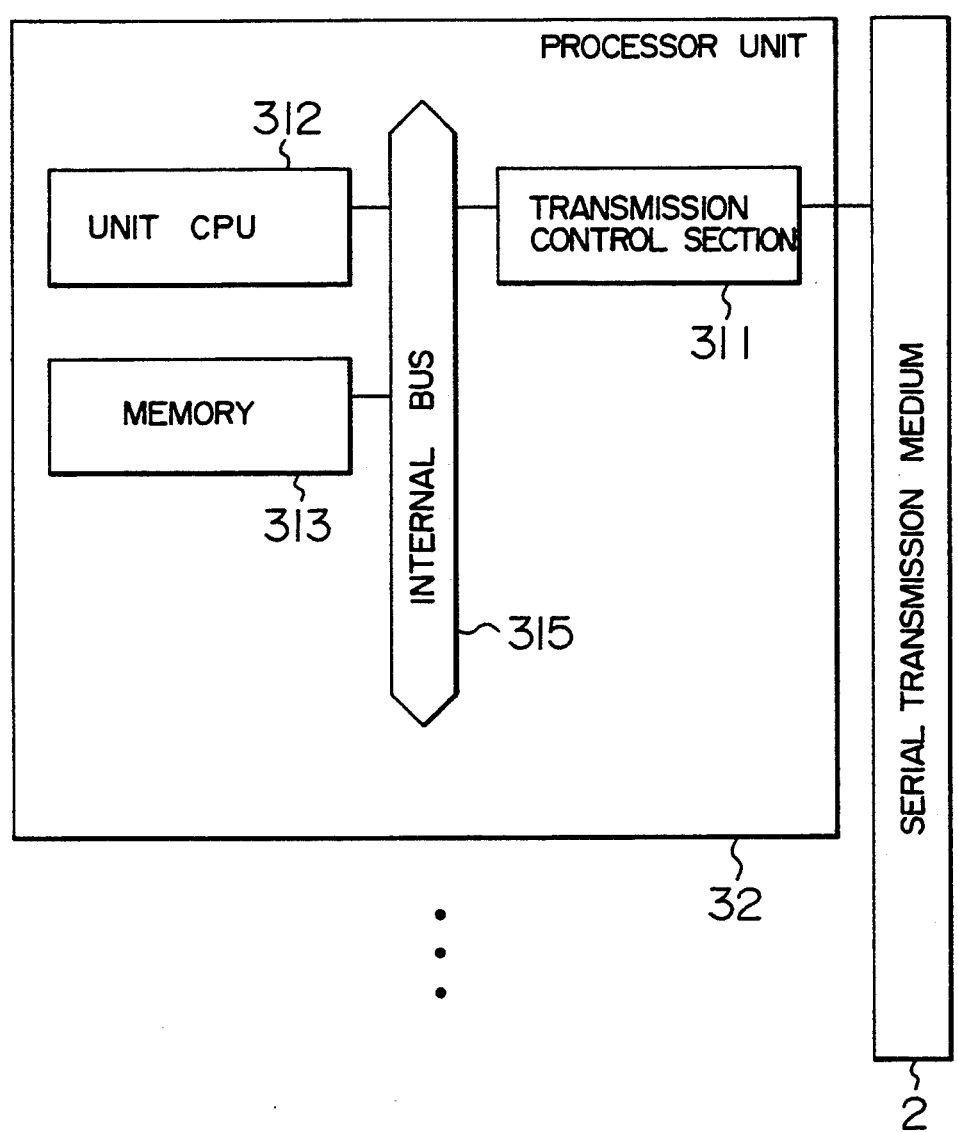

In FIG. 2b, there is shown an internal arrangement of the processor unit 32, in which a memory 313 is connected via an internal bus 315 to both the transmission control unit 311 and a unit CPU 312. This memory 313 is operated under control of the unit CPU 312 and has a function as the storage device in the conventional computer.

Figure 2C:
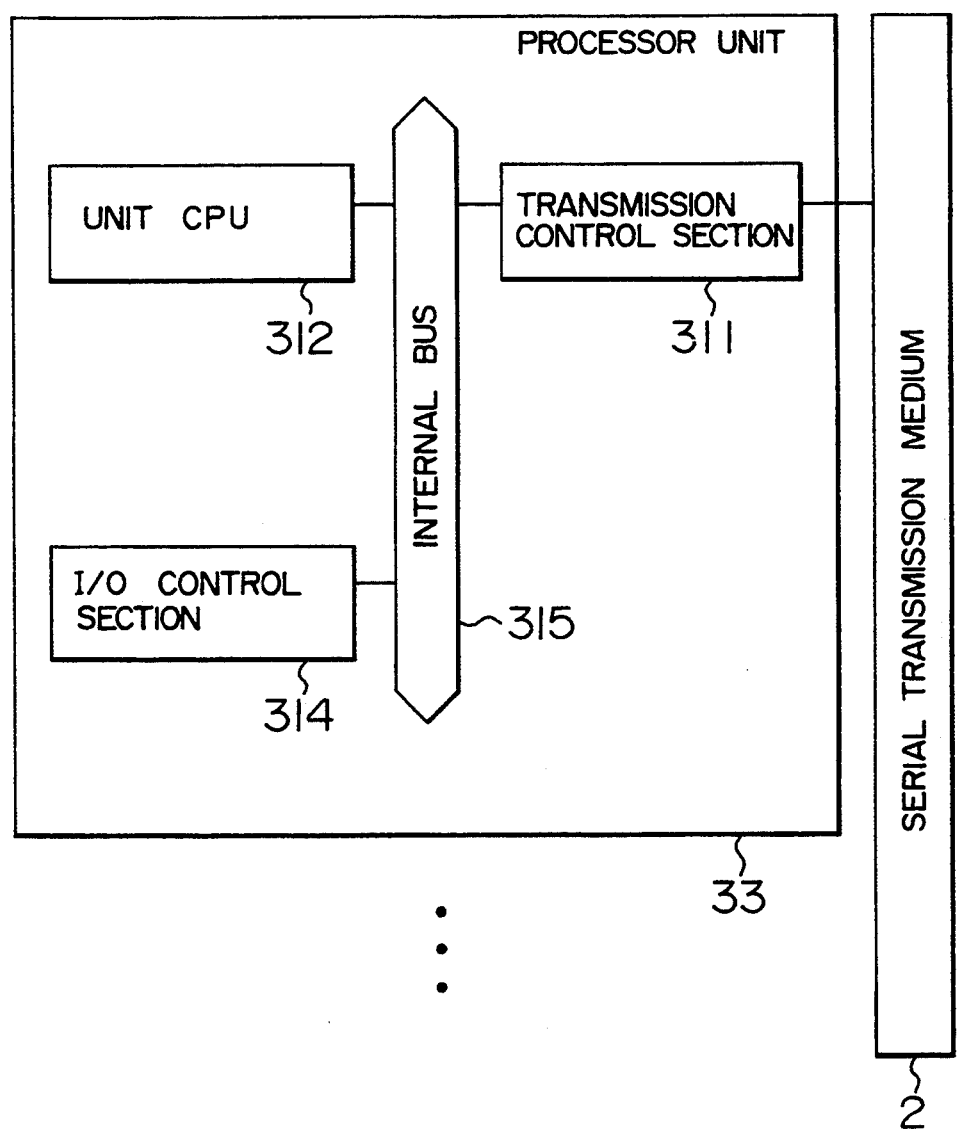

FIG. 2c represents an internal arrangement of the processor unit 33. An I/O control section 314 is connected via an internal bus 315 to the transmission control section 311 and unit CPU 312. As represented in FIG. 1, the input/output device 63, disk 61 and printer 62 are connected via this I/O control section 314, which is completely similar to the constructions of the processor unit 34 and 35 shown in FIG. 1.

The processor unit 33 is operated under control of the unit CPU 312, and has such a function as the input/output device in the conventional computer.

Figure 2D:
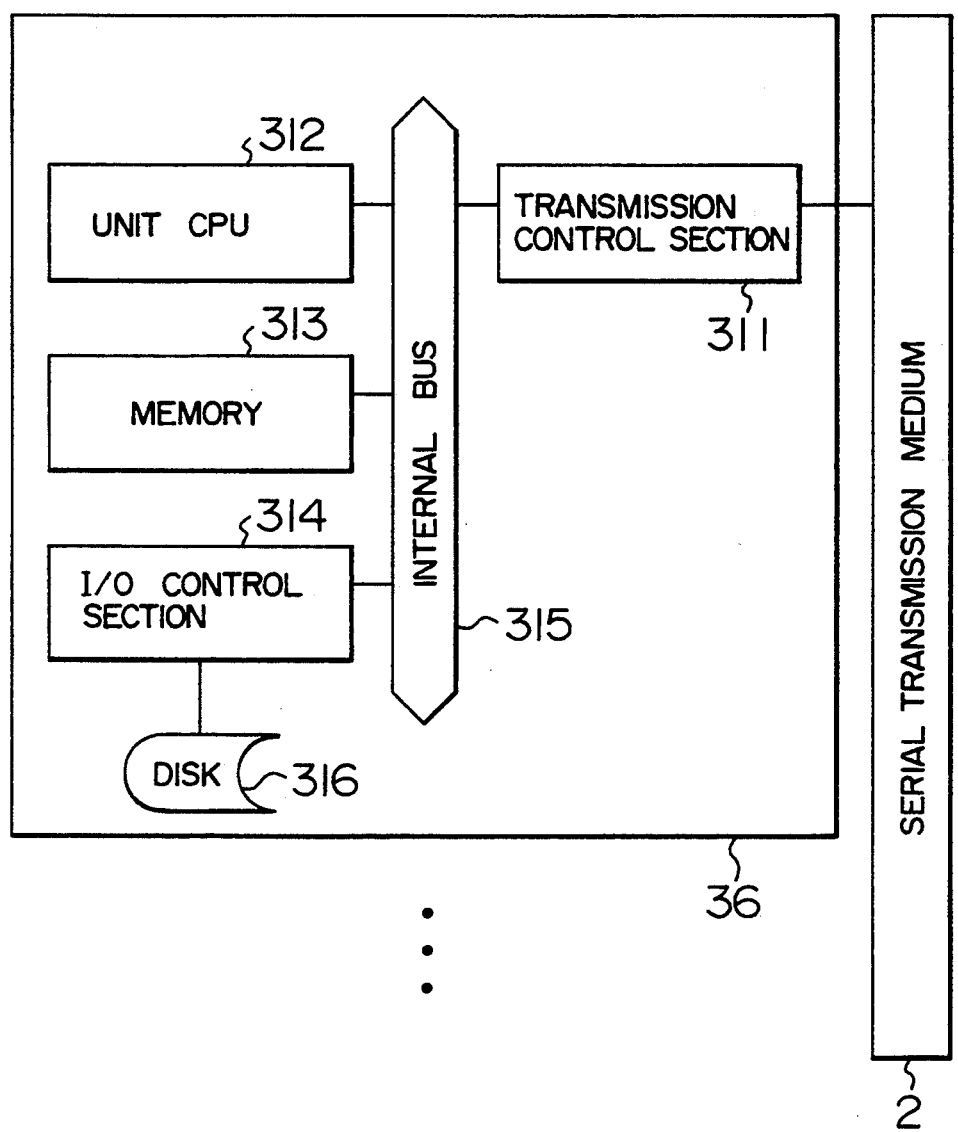

FIG. 2d indicates an internal construction of the processor unit 36. The processor unit 37 shown in FIG. 1 has the similar internal arrangement, and the processor unit 36 has a function as a single computer. That is to say, both a memory 313 and I/O control section 314 are connected via an internal bus 315 to a transmission control unit 311 and a unit CPU 312. Further, a disk 316 as an internal storage medium is connected the I/O control section 314.

It should be noted that this disk 316 may be provided outside the computer 1 shown in FIG. 1, which is similar to the disk 61 of the processor unit 34. Moreover not only the disk, but also the input/output device or printer may be connected thereto.

As previously described, the processing operations are carried out by utilizing the program and data stored in the memory 313 or disk 316 by way of the unit CPU 312 in the processor unit 36. The processor unit 36 receives the data derived from other processor units via the serial transmission medium 2 and also sends out the data of its own processor unit to other processor units, if required.

As a result, the computer 1 shown in FIG. 1 may execute a plurality of processing operations with respect to a single job by mutually operating the respective processor units.

It should be understood that the connection arrangements shown in FIG. 2 are merely represented as examples for the computer 1, and therefore may be readily modified in accordance with the desirable function.

As previously described, the independent processor units are so connected to the serial transmission medium 2 within the computer 1 shown in FIG. 1, whereby the computer 1 is realized as a loosely coupled multiprocessor computer.

Figure 3:
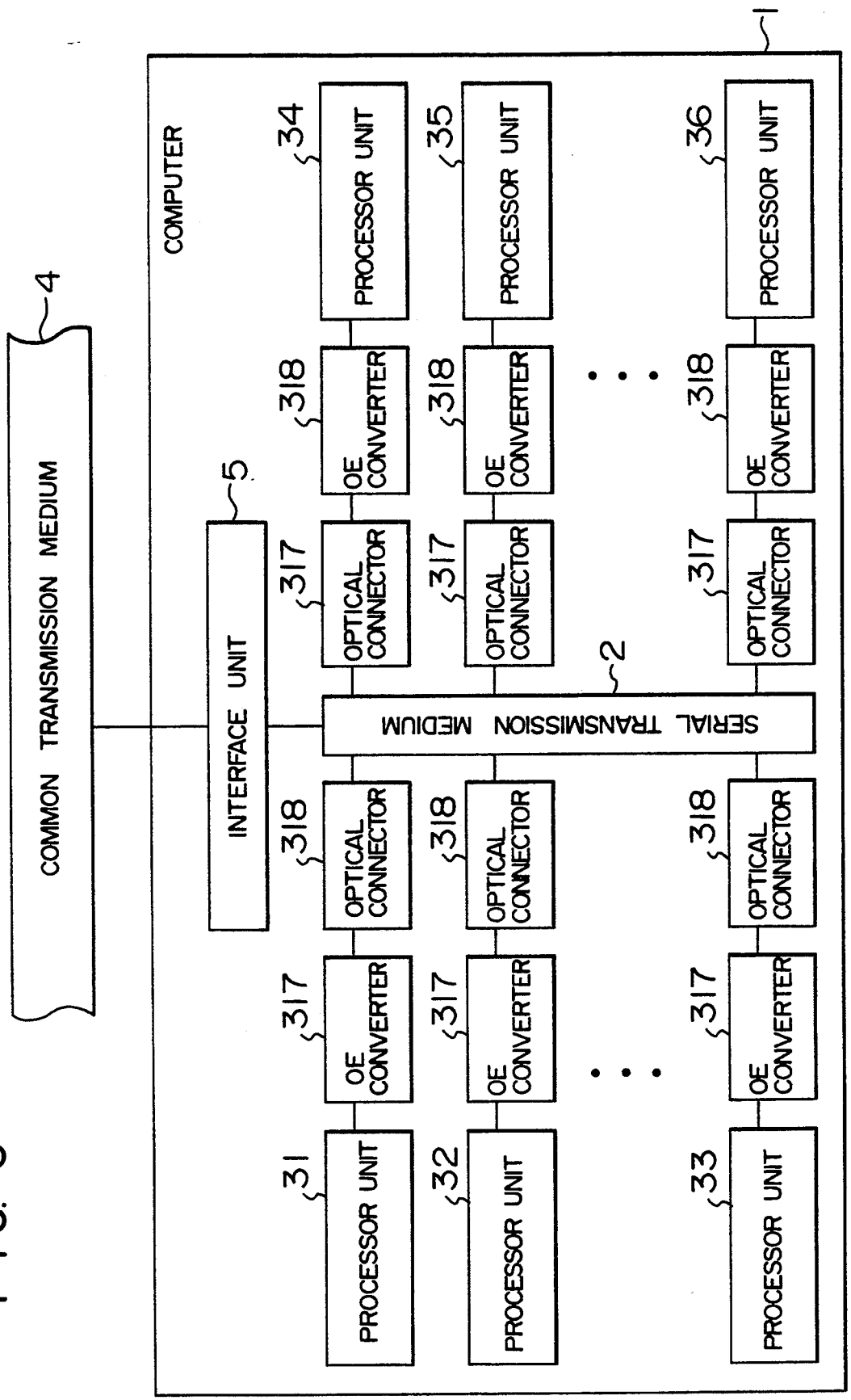
FIG. 3 is a schematic block diagram of an arrangement of a computer employing an optical fiber as a serial transmission medium shown in FIG. 1.

FIG. 3 is a schematic block diagram for representing an arrangement of a computer when an optical fiber is employed as the serial transmission medium shown in FIG. 1.

In other words, the serial transmission medium 2 of the computer 1 shown in FIG. 1 is realized by an optical fiber.

To connect each of the processor units to a serial transmission medium 2 made of an optical fiber, both an OE converter 317 and an optical connector 318 are additionally employed.

The OE converter 317 converts an electric signal processed in the transmission control section 311 into an optical (laser light) signal, whereas the optical connector 318 optically connects the OE converter 317 with the serial transmission medium 2 made of an optical fiber.

Each of the processor units may be disconnected from computer 1 with employment of this optical connector 318, so that the maintenance and expansion processing operations may be performed without interrupting the computation by the computer 1.

More specifically, since the optical fiber is employed and the connection/disconnection of the processor units are realized at the optical connector units, prevention of electric arc and the like which occur due to the electrical connection/disconnection of the processor units is possible. As a consequence, the electrical connection/disconnection of the processor units during the maintenance and expansion may be more safely carried out even when the computer 1 is under operation.

Figure 4:
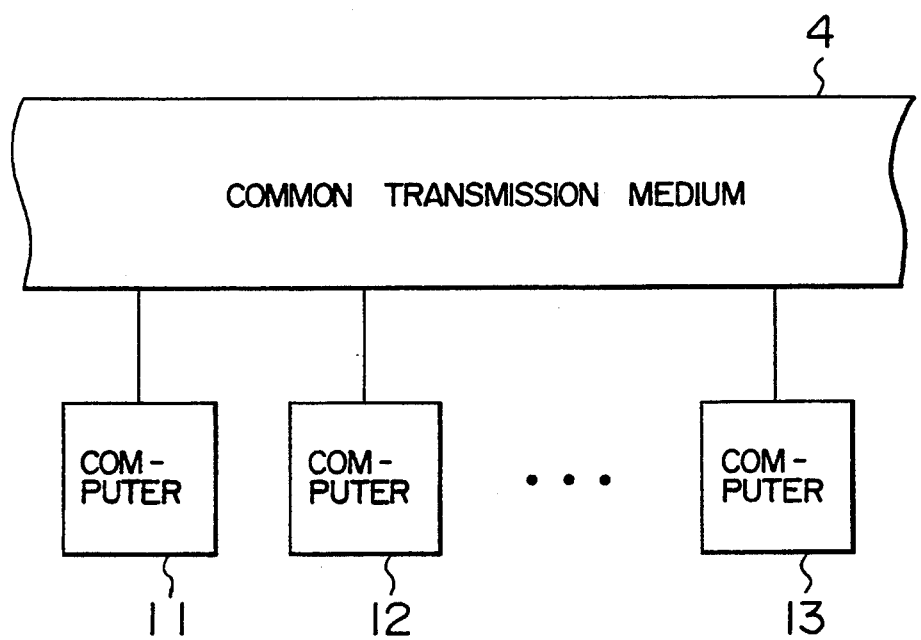
FIG. 4 is a schematic block diagram for showing a simple construction of a multiprocessor system employing the computer shown in FIG. 1.

FIG. 4 is a schematic block diagram for showing a simple construction of a multiprocessor system employing the computers shown in FIG. 1.

The respective computers 11 to 13 each having the same arrangement as that of the computer shown in FIG. 1 are connected via a common transmission medium 4 to each other, which is completely similar to the conventional multiprocessor system.

With this arrangement, each of the computers 11, 12 and 13 may perform the parallel processing operation, which is similar to that of the conventional computer.

Furthermore, if, for instance, the functions of a computer are expanded in the conventional computer system, the power source of this computer must be turned off to cease the functions of the computer before the expansion should be carried out. However, in the computer 11 according to the loosely coupled multi-processor computer of the present invention, since the function related only to the expansion processing operation may be interrupted, the processing operations for the multiprocessor system may be continuously carried out.

Next, the data transmission procedure executed among the processor units via the serial transmission medium 2 shown in FIG. 1 will now be explained.

Figure 5:
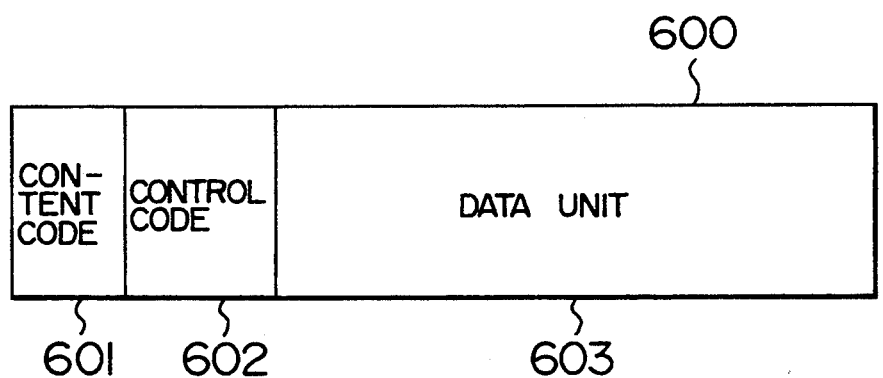
FIG. 5 is an illustration for explaining a data format 11 transferred/received via the serial transmission medium shown in FIG. 1.

FIG. 5 schematically illustrates a format of data which are transmitted/received via the serial transmission medium shown in FIG. 1.

The data 600 is constructed of a content code 601 representative of a content of the data, a control code 602, and a data unit 603.

In FIG. 1, when data is transmitted from the respective processor units to the serial transmission medium 2, the content code 601 is set into this data. This data is broadcasted (reported) via the serial transmission medium 2 to other processor unit. While investigating the content code 601 of the data flowing through this serial transmission medium 2, each of these processor units may fetch only data which must be required for own processor unit.

Which content code of the data to be fetched, has been set into the transmission control unit 311 in the respective processor units.

Subsequently, the interface unit 5 of the computer 1 will now be described.

Figure 6:
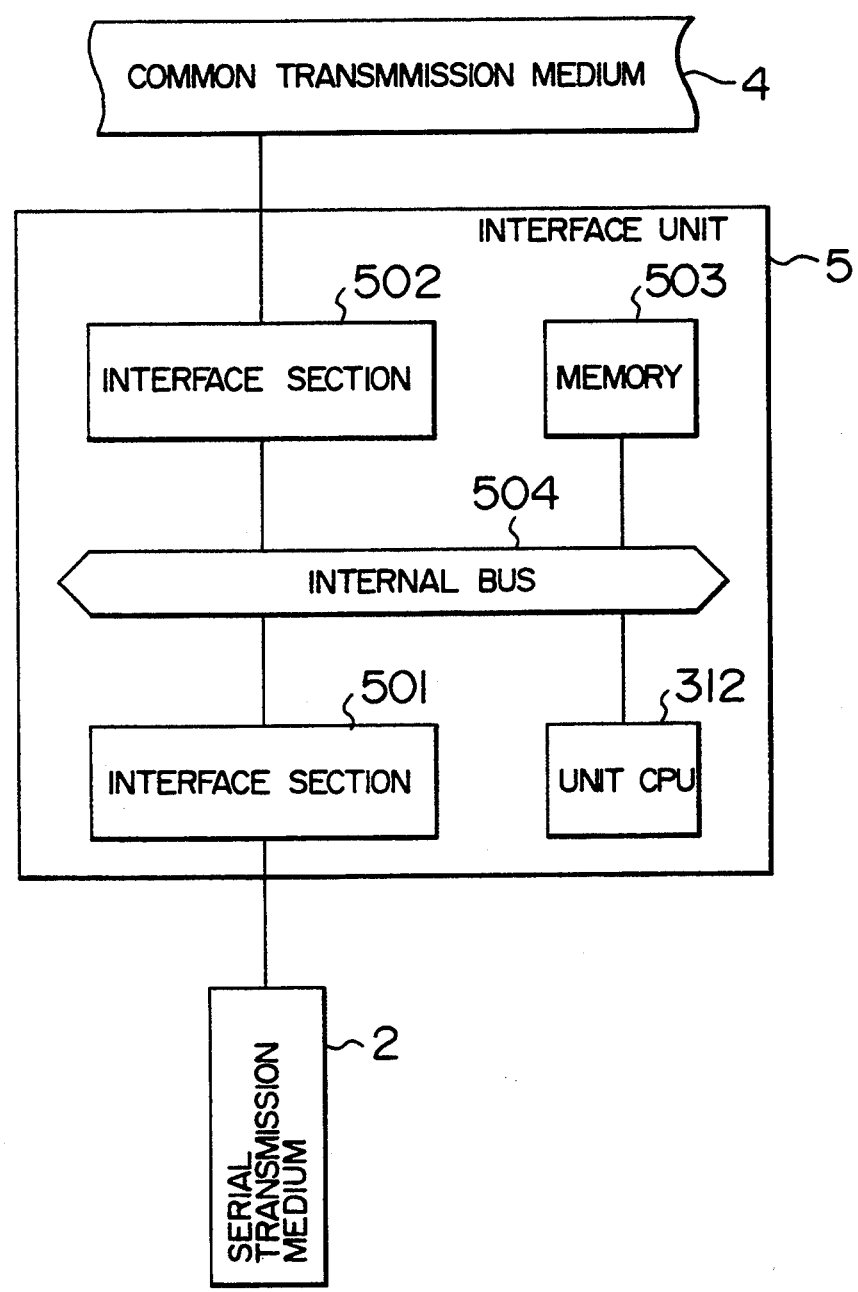
FIG. 6 is a schematic block diagram for representing an internal arrangement of an interface unit shown in FIG. 1.

FIG. 6 is a schematic block diagram for showing an internal arrangement of the interface unit 5 represented in FIG. 1.

An interface section 501 for interfacing the serial transmission medium 2 therewith, an interface section 502 for interfacing the common transmission medium 4, and a memory 503 and also a unit CPU 312 are connected via an internal bus 504 to each other.

The interface section 501 corresponds to a transmission control unit 311 shown in FIG. 2. As previously stated, the construction of the interface unit 5 is similar to that of each of the processor units shown in FIG. 1. The interface unit 5 may be regarded as the processor unit which executes the data transmission/reception among the computers under the control of the unit CPU 312.

The interface unit 5 with the above-described construction may be operated as an interface for interfacing the common transmission medium 4 for coupling the computers which perform the parallel processing operations, and the serial transmission medium 2 for coupling the processor units within the computer.

That is to say, the data flowing through the serial transmission medium 2 is received by the interface section 501 and transmitted via the internal bus 504 employed in the unit to the interface section 502, if required. The interface section 502 sends out the data derived from the interface section 501 to the common transmission medium 4.

On the other hand, the data flowing through the common transmission medium 4 is fetched by the interface section 502, and then transferred to the interface section 501, if necessary, and to the serial transmission medium 2.

The memory 503 temporarily stores (buffers) data to be transmitted and/or received, and is used as a storage area for a program and data which are utilized to be processed in the interface sections 501 and 502.

As previously described, the structure of this interface unit 5 is, in principle, the same as that of each of the processor units shown in FIG. 1. As to the transmission function via the serial transmission medium 2, both the interface unit 5 and processor unit have the similar functions. In this interface unit 5, an application process may be executed and the I/O control section 314 (refer to FIG. 2c) may be employed.

It should be also noted that the structure of the common transmission medium 4 for coupling the computers may be the same as that of the serial transmission medium 2, and furthermore may be constructed of a normal LAN (Local Area Network). In this case, the interface unit 5 has such a function corresponding to a so-called "bridge" device in LAN.

Figure 7:
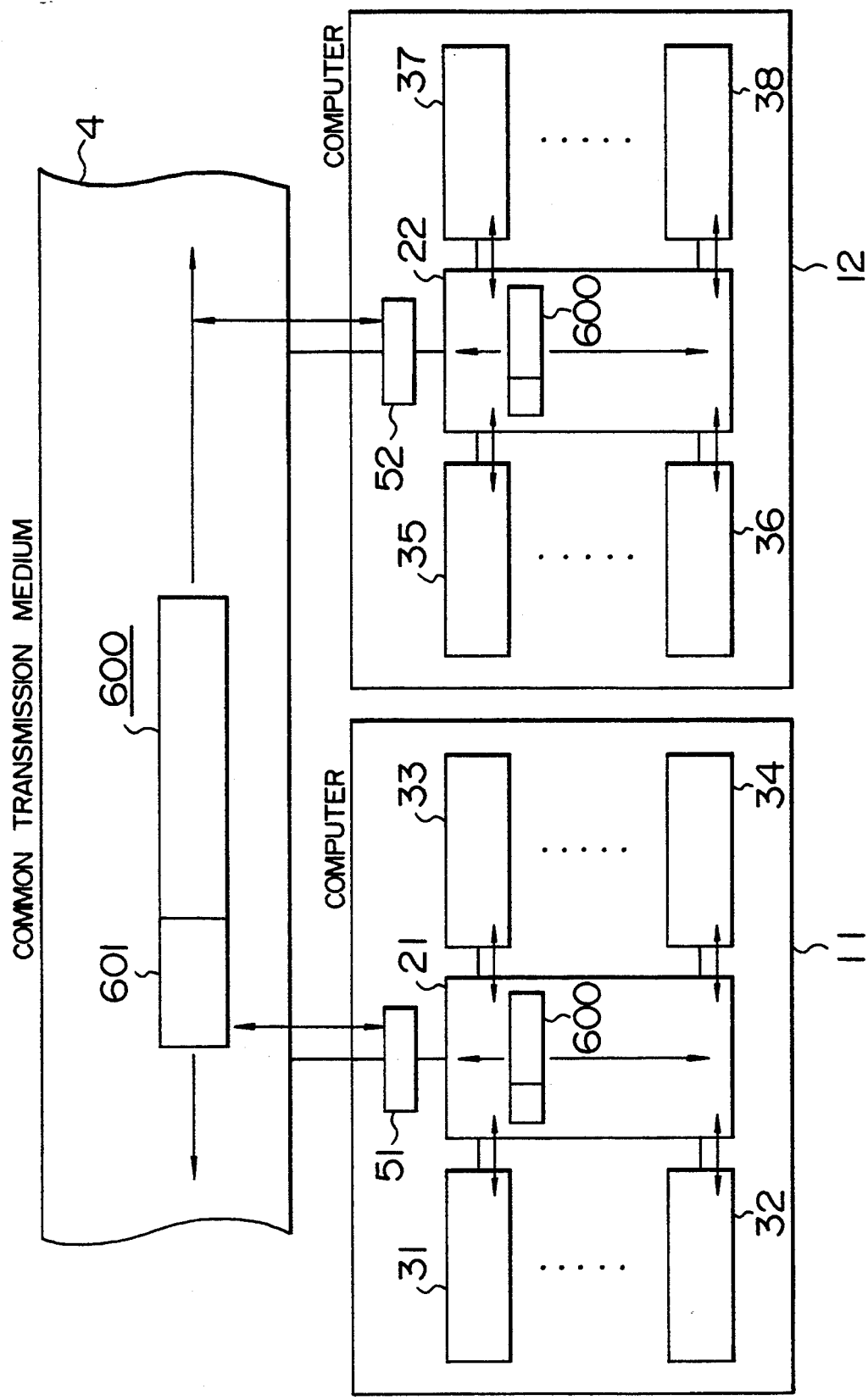
FIG. 7 is a schematic block diagram for representing an arrangement of a multiprocessor system employing the computer shown in FIG. 7.
Figure 8:
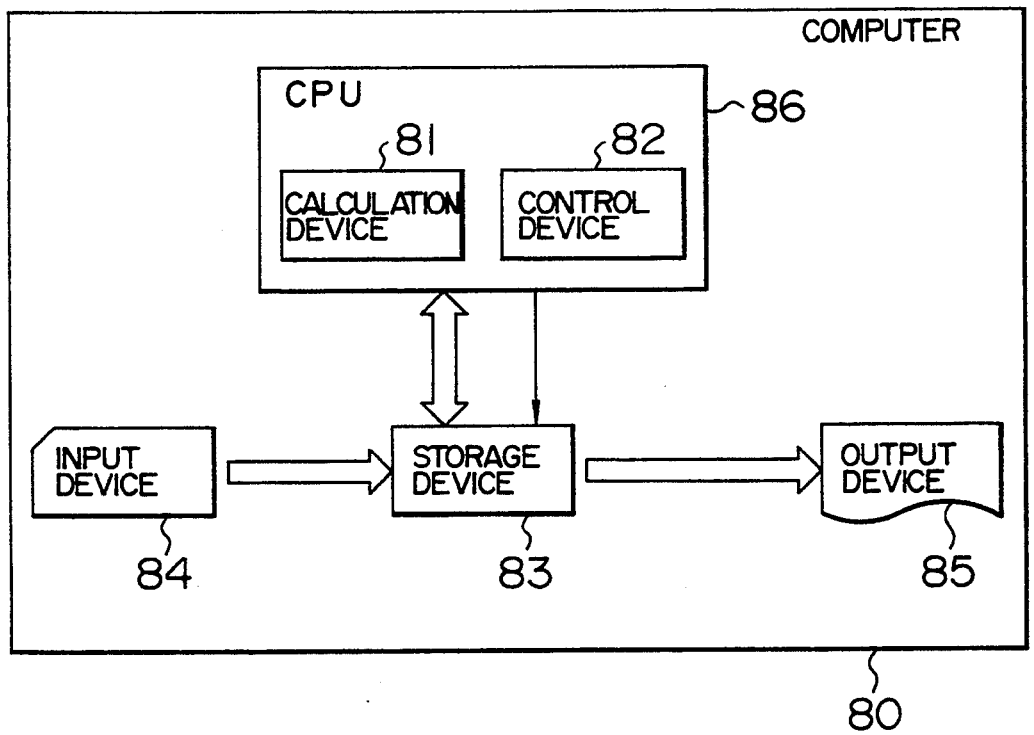
FIG. 8 is a schematic block diagram for showing a basic arrangement of the conventional computer.
Figure 9:
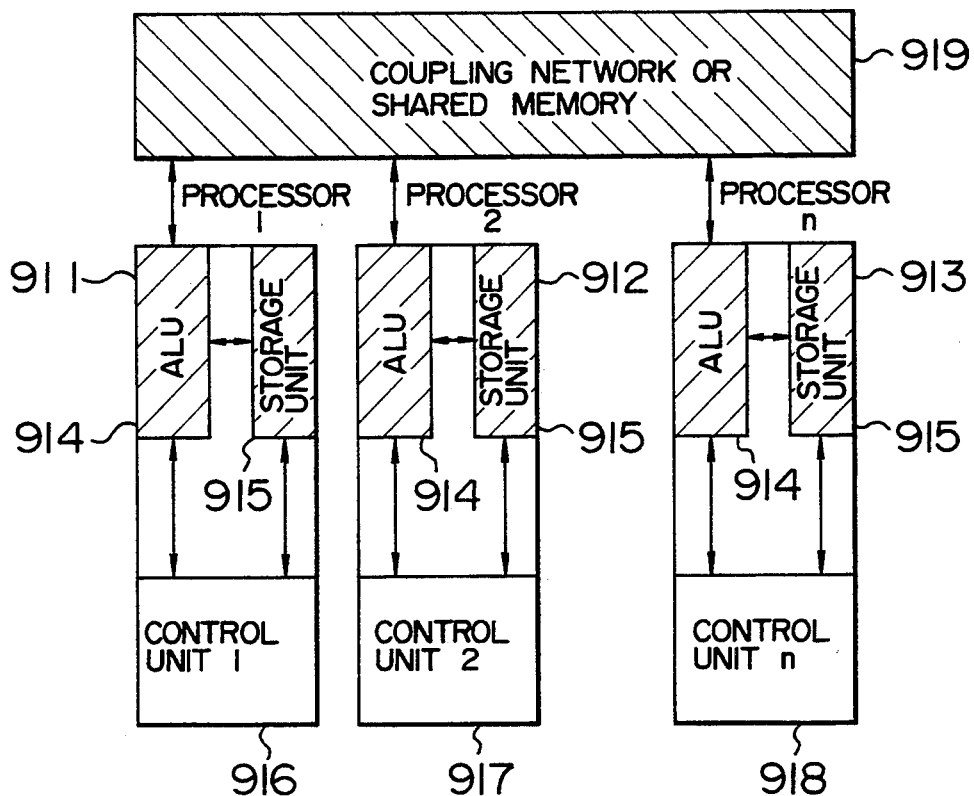
FIG. 9 is a schematic block diagram for representing a construction of the MIMD system.

FIG. 7 schematically represents a structure and an operation of the multiprocessor system employing the computer shown in FIG. 1.

This figure represents such a condition that the data flowing through a single computer and plural computers are transmitted and/or received among the processor units employed in the respective computers.

In particular, this figure represents such a case that a data transmission method with a content code for describing a method to transmit/receive data is utilized.

Transmission data of a single processor unit, for instance, the processor unit 31 is first broadcasted via the serial transmission medium 21 within the computer 11 including this processor unit 31.

It is possible to determine the data transmission sequence between the computers 11 and 12 via common transmission medium independent of the data transmission sequence between processors via serial transmission medium in a computer. Also, a normal LAN may be employed.

Even in the computers, when the data transmission/reception are carried out with employment of the data having the content code, for instance, the interface unit 51 within the computer receives the data which has been broadcasted via the serial transmission medium 21 and broadcasts this data to the common transmission medium 4 among the computers. Then, the interface unit 52 within the computer fetches the data which has been broadcasted via the common transmission medium 4, and the computer 12 broadcasts this data to the serial transmission medium 22 within the computer.

The way of setting the content code may be determined freely for data transmitted between computers and also for data transmitted between processors of a computer. The both codes may be the same in accordance with their protocols. In case of the same setting method, the data flowing through the computer directly flows among the computers. Also, in case of the different setting methods, the content codes are substituted with each other in the interface units 51 and 52. This substitution is made by deleting one content code from data and adding the other code instead thereof to the data.

As previously explained, in accordance with the preferred embodiments of the present invention, since the processor units within the computer are loosely coupled with each other, the processor units may be connected/disconnected under on-line condition of the computer system. As a consequence, to improve the processing capabilities as well as the reliabilities of the computer, the functions may be expanded and also the maintenance of the computer may be carried out without interruption of the computer jobs which have already been operated when a user makes his command.

Furthermore, since the processing capabilities, functions and reliabilities of the computer may be controlled by adjusting the quantity of the processor units built in this computer, every user need not establish a series of computers with various grades, but also need not replace the computer with a single computer unit.

In addition, the overall system of the computer need not be interrupted during maintenance of the computer system, especially the version-up of the software such as the operating system, and therefore maintenance required for a portion of the computer system may be independently executed in the overall computer system.

Also, since the loads on the computer may be distributed to a plurality of processor units within the computer, the overall processing capabilities of the computer system may be increased.

Thus, if the processor units within the computer include only the interfaces with the serial transmission medium, then these processor units may communicate with each other, so that these processor units may be constituted as a multiprocessor, irrelevant to the model of the processor units and also the operating system for the processor units.

In addition, since the function distribution and load distribution may be realized within a single computer, these function/load distributions do not depend upon either the computer setting place, or computer user. Namely, the number of processors included in a computer may be changed without stopping a user's programs in response to requirement of load distribution in the whole system. To the contrary, when the function/load are distributed among the computers, these load/function distributions depend upon the computer setting place and/or computer user.

Moreover, since only the specifically restricted processing operations are performed by the respective processor units within the computer, and also these specifically restricted processing operations are combined with each other so as to execute a single job, the operating systems for managing the software of the respective processor units may be simplified, resulting in lower cost.

Figure 10:
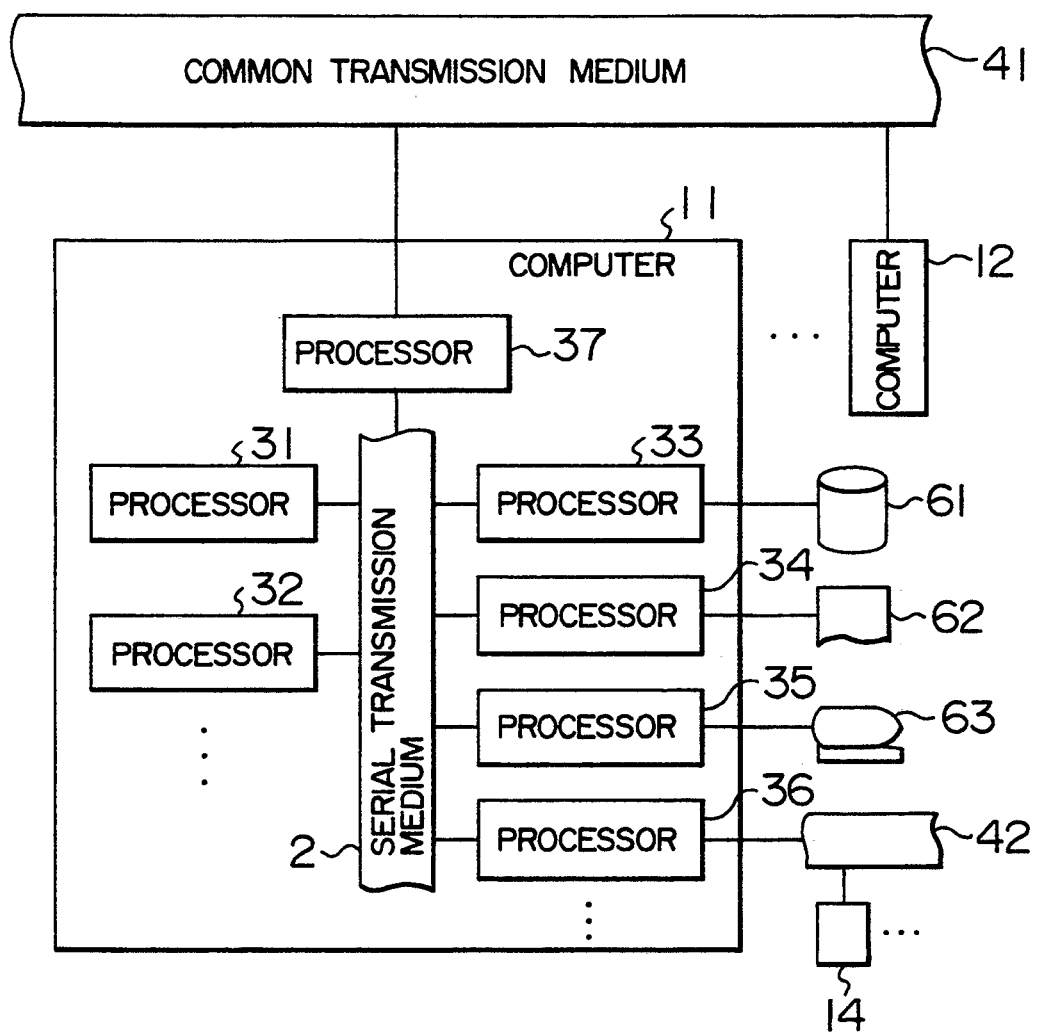
FIG. 10 is a schematic block diagram for representing a computer according to another preferred embodiment of the present invention.

FIG. 10 is a schematic block diagram of a computer system according to another embodiment of the present invention.

A computer 11 is constructed of a plurality of processor 31 to 37 and a common transmission medium 2 for coupling the processors set within this computer. It should be noted that the common transmission medium 2 corresponds to a serial transmission medium utilized in a network communication and a wireless communication. The computer 11 is coupled via a common transmission medium 41 for coupling the computers to another computer 12. The processors 33 to 36 own an interface function with an external apparatus (external input/output apparatus), and are connected to each of disk device 61, printer device 62, terminal device 63, and communication line (trunk) 42. Information (data) transmission/reception among the processors are performed only through the serial transmission medium 2. Neither a system bus nor a shared memory is provided among the processors, which is similar to the conventional multi-processor. The processor 37 is mutually connected to the serial transmission medium 2 and common transmission medium 41, and performs a process to relay one information (data) flowing through one transmission medium to the other information (data) flowing through the other transmission medium. The processor 36 is also connected to the communication line 42 functioning as one common transmission medium. However, this communication line 42 corresponds to the external device for the processor 36. As a consequence, the information which is transmitted/received via the communication line 42 to/from another computer 14, is utilized so as to be processed in the processor 36.

It should be understood that both the sorts of the processors and quantities thereof corresponding to the constructive element of the computer according to the preferred embodiment do not define the internal constructive element of the computer 11, but may be selected in conformity to the utility of this computer 11, and the processors are connected to the serial transmission medium. As a consequence, for instance, only necessary external devices may be connected to the corresponding processors, which may therefore constitute the external device of the computer 11. In other words, the computer 11 may be constructed by arbitrarily combining the processors having the various functions.

Figure 11:
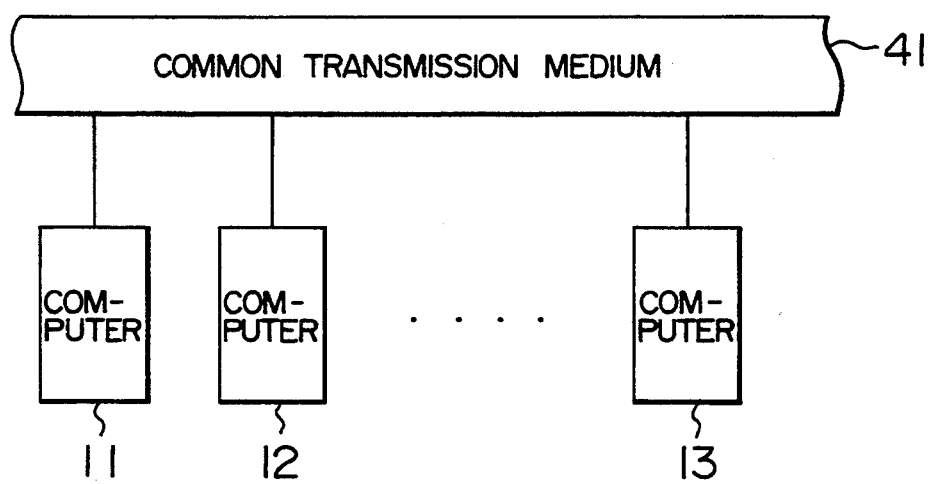
FIG. 11 is a schematic block diagram for showing a system in which a plurality of computers shown in FIG. 10 are connected to each other.

FIG. 11 is a schematic block diagram of another preferred embodiment in which a plurality of computers 11 to 13 are connected with each other via a common transmission medium. It should be noted that both the computer 12 and 13 may be constructed of either the computers using the inventive system, or the conventional computers. The computer 11 using the inventive system may transmit and receive the information via the common transmission medium 41 to and from other computers.

FIG. 12 is a schematic block diagram for showing an example of an internal arrangement of the processors to constitute the computer 11. A processor 31 is arranged by a transmission control section 311 functioning as an interface with the serial transmission medium 2, a calculation processing section 312, and a local memory 313 of the calculation processing section 312. A processor 32 has a structure similar to that of the processor 31, and is constructed of a transmission control section 311, a calculation processing section 322, and a local memory 323 for the calculation processing section 322. It should be noted that the internal arrangements of these processors 31 and 32 need not be exclusively designed to the arrangement shown in FIG. 3, except that these processors own the interface with the serial transmission medium 2. FIG. 13 illustrates an example in which a processor includes an interface section 334 for interfacing an external device 61 (external input apparatus) of a computer and therewith. As this external device 61, i.e., a disk device, a printer device, a terminal device (CRT, keyboard), and a line may be freely employed.

Figure 14:
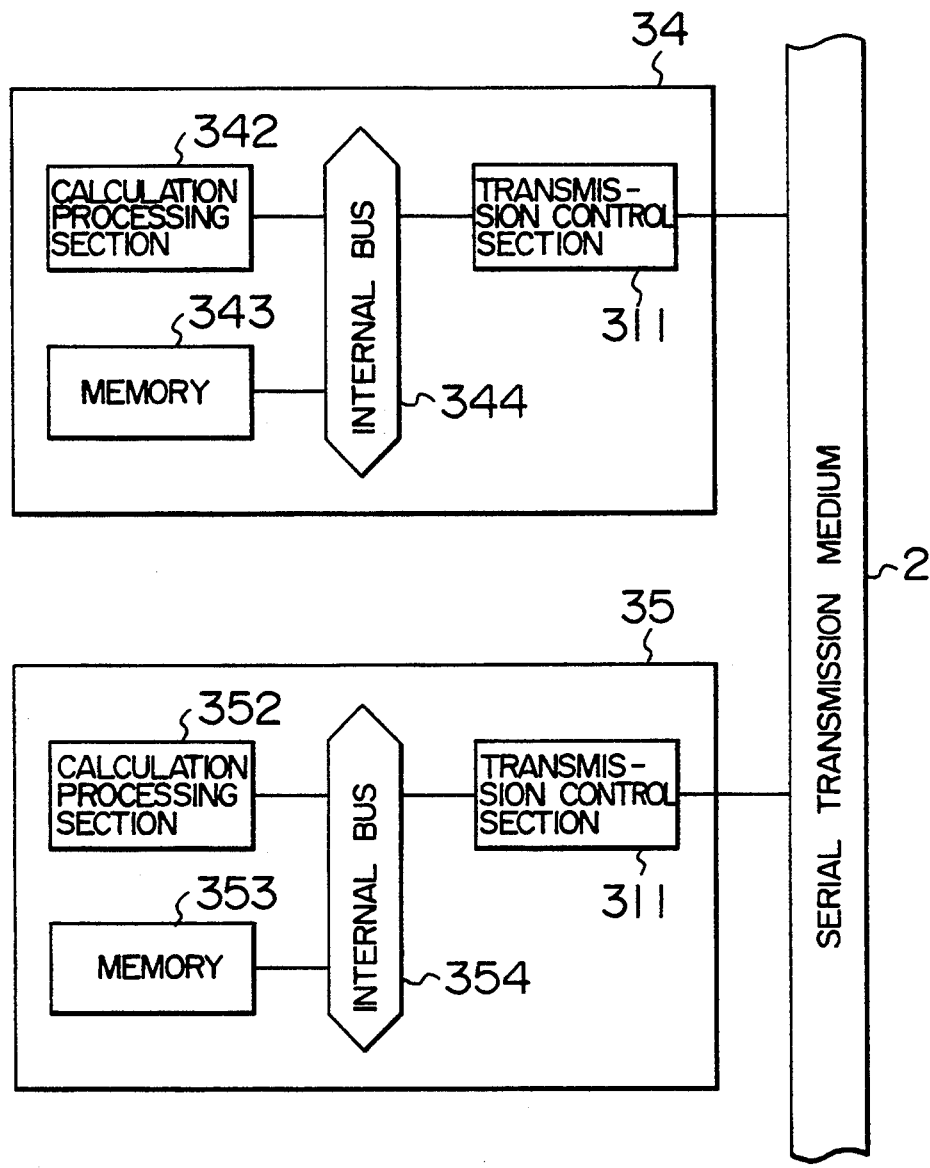

Also, as represented in FIG. 14, it should be noted that calculation processing sections 342, 352 and local memories 343, 353 may be different from each other in each of the processors 134 and 135. That is to say, it is known that various types of conventional calculation processing sections and local memories have been commercially available. If these elements own the interface function with the serial transmission medium, these elements may be employed as the constituting elements of the processors. For instance, the processing method of the calculation processing section, the processing speed, the word length, the accessing method of the local memory, the memory capacity of the local memory and the like may be different from each other in the respective processors. It should be noted that these calculation processing section and transmission control section 311 are connected to each other via internal buses 344 and 354.

Figure 15:
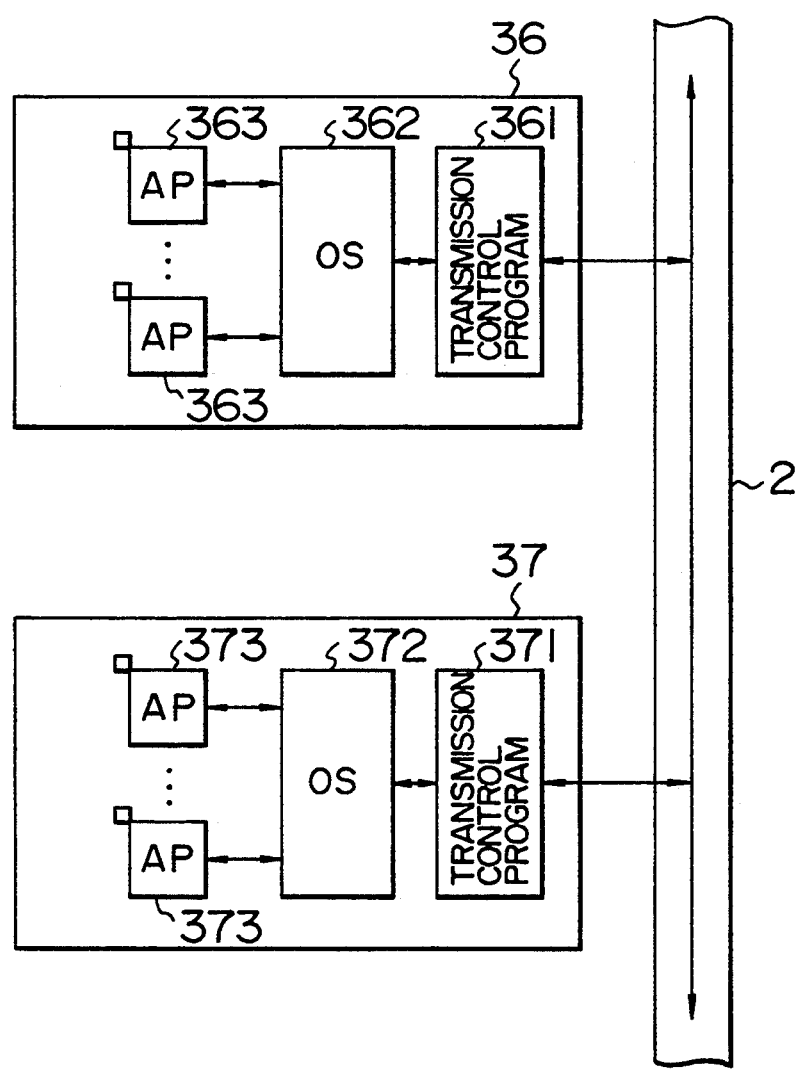
FIG. 15 is a schematic block diagram of a software executed on an internal arrangement of the computer shown in FIG. 10; and, FIG. 16 is a schematic block diagram for explaining that an optical transmission medium is employed as the serial transmission medium within the computer shown in FIG. 10, and is detachably connected with the transmission medium of the processor.

FIG. 15 is a schematic block diagram for representing a functional structure of a program (software) operated on each of processors 36 and 37. Reference numerals 361 and 371 indicates a transmission control program by which information transmission/reception are carried out via a serial transmission medium to other processors. Reference numerals 362 and 372 represent system programs (operating systems) for managing application programs 363 and 373 executed in the respective processors 36 and 37. Each of the system programs 362 and 372 owns transmission control programs 361 and 371 and an interface, and each of these control programs performs the information transmission/reception among other processors.

This information transmission and reception are realized in conformity with the data format shown in FIG. 5. It is assumed that a concrete attribute (data length, sort of data code) of the data format is previously determined. Each of the processor units performs the information transmission/reception in conformity with this data format. As previously stated, in case that LAN corresponding to prior art is employed as the serial transmission medium 2, the data format should be defined in accordance with that used in prior art.

The processing operations performed in the respective processor units are independently carried out with respect to those of other processor units, other than the processing operation of the information transmission/reception via the serial transmission medium. As previously described, the sorts of the processors and of the operating systems may be different from each other. Only when one process for transmitting the data on the processing result at this processor unit to the serial transmission medium, and also the other process for fetching the data from this serial transmission medium are carried out, a conversion process is executed between the above-described data format which has been totally determined and the format of the respective processor units. This conversion process is performed by the transmission control section.

As previously represented, the transmission control sequence for transmitting/receiving the information is performed based upon a predetermined proper sequence.

Figure 16:
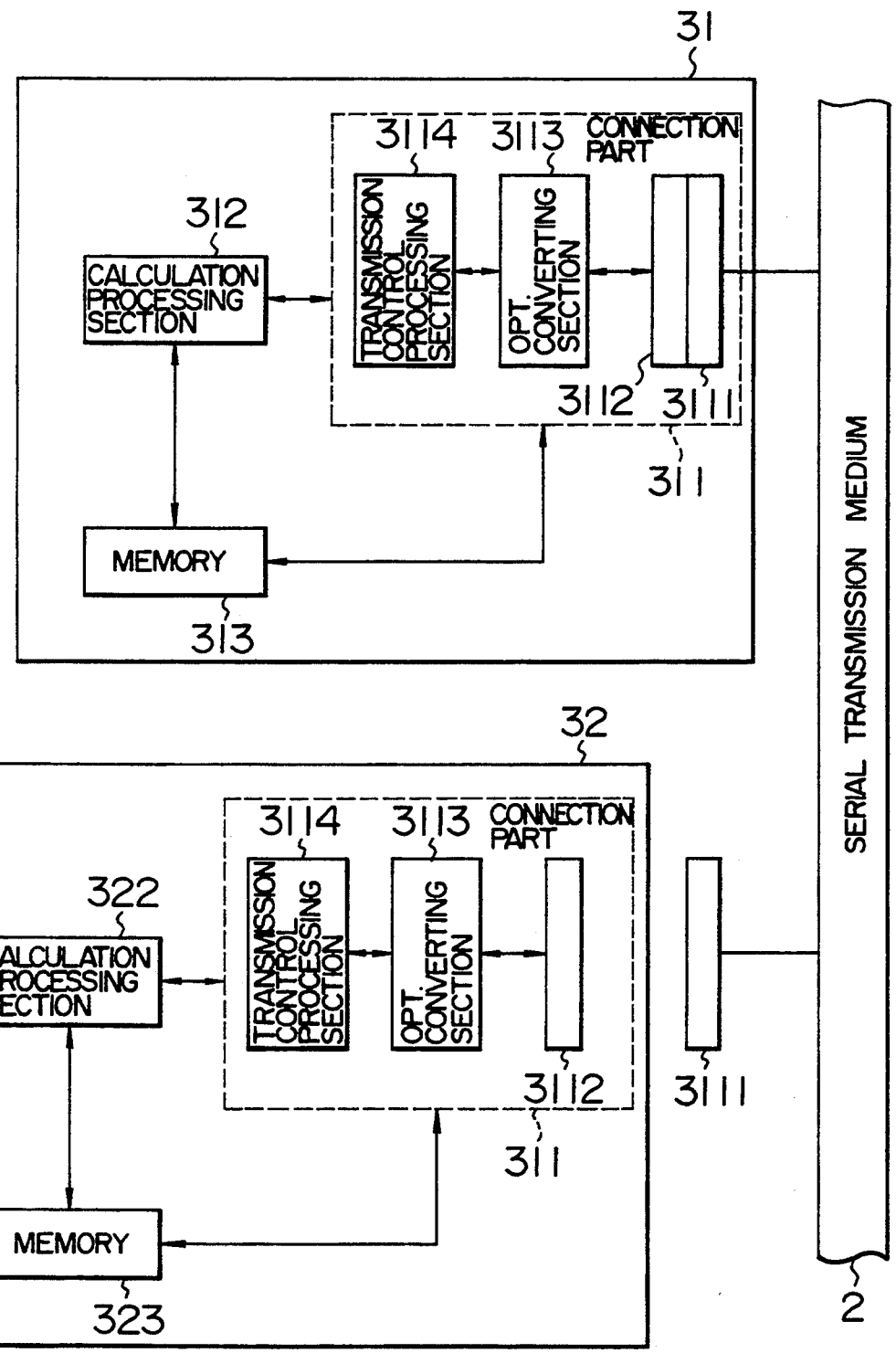

FIG. 16 is a schematic block diagram for representing the transmission control sections 311 of the processor more in detail. FIG. 16 is such an example where an optical transmission medium is employed as the serial transmission medium 2. Each of the transmission control sections 311 is constructed of connection sections (connector sections) 3111, 3112 with the optical transmission medium, an opto/electric converting section 3113, and a transmission control processing section 3114. The connection sections 3111 and 3112 correspond to connectors. Light cannot be transferred to the part 3112 by disconnecting the part 3111 from the part 3112. Under such a disconnecting state, when the part 3111 is connected to the part 3112, the light can be transferred to the part 3112. When this mechanism is incorporated into the processors, each of these processors may be connected/disconnected to the serial transmission medium. In other words, the processors for constituting the computer may be connected/disconnected, if required. Since the connecting/disconnecting parts correspond to optical interface parts, there is no risk that short circuit and discharge phenomena will occur, as in the electrical interface parts. As a result, each of the processors may be connected/disconnected to/from the computer system, while operating all of the processors. In other words, there is no adverse influence given to the hardware of the processor units and serial transmission medium, when these optical interface units are connected/disconnected.

On the other hand, as previously described, the adverse influence given to the software operable on the processor units may be avoided by setting a function such as the conventional LAN to the serial transmission medium. For instance, as the conventional token ring LAN, an automatic mechanism control function may be set to the serial transmission medium, by which the information transmission/reception among the computers coupled to this token ring LAN are guaranteed when the transmission control apparatus is connected/disconnected to/from the computer system.

We claim:
1. A computer comprising:
(a) transmission medium;
(b) a storage unit connected with said transmission medium for storing therein a program and data, said storage unit including:
  storage means for storing therein said program and said data,
  first transmission control means for communicating information with said transmission medium, and
  first unit processing means for controlling said first transmission control means to selectively store the program and data transmitted on said transmission medium into said storage means and to transmit the program and data from said storage onto said transmission medium;
(c) a processing unit connected with said transmission medium for executing a data processing based on said program stored in said storage unit, said processing unit including second transmission control means for transmitting information with said transmission medium;
(d) an input unit connected with said transmission medium for inputting data therefrom, said input unit including:
  input means for inputting said data,
  third transmission control means for sending out data inputted by said input means, and
  second unit processing means for controlling said input means and said transmission control means; and
(e) an outputting unit connected with said transmission medium for outputting a result of said data processing executed in said processing unit, said outputting unit including:

fourth transmission control means for receiving said result of said data processing from said transmission medium, outputting means for outputting said result of said data processing received by said transmission control means, and third unit processing means for controlling said outputting means and said transmission control means of said outputting unit.

2. A computer according to claim 1, wherein each of said transmission control means sends out a program/data attached with a content code representing contents of said program/data onto said transmission medium and receives a program/data necessitated for processing in a unit into which said each transmission control means included among program/data transmitted on said transmission medium based on said content code.

3. A computer according to claim 1, wherein said transmission medium is a serial transmission medium.

4. A computer according to claim 3, wherein said serial transmission medium is comprised of optical fibers.

5. A computer according to claim 1, further comprising an interface unit for exchanging information via a network with other computers, said interface unit including:

fifth transmission control means for transmitting information with said transmission medium, sixth transmission control means for transmitting information to said network, and fourth unit processing means for controlling said fifth and sixth transmission control means.

6. A computer according to claim 1, comprising a plurality of processing units.

7. A computer according to claim 1, wherein said transmission medium, said storage unit, said processing unit, said inputting unit, and said outputting unit are included in one housing.

* * * * *